US011561291B2

(12) United States Patent
Marcus et al.

(10) Patent No.: US 11,561,291 B2
(45) Date of Patent: Jan. 24, 2023

(54) HIGH PULSE REPETITION FREQUENCY LIDAR

(71) Applicant: RAYTHEON COMPANY, Waltham, MA (US)

(72) Inventors: Eran Marcus, Culver City, CA (US); Joseph Marron, Manhattan Beach, CA (US); Adam Hodge Greenberg, Los Angeles, CA (US)

(73) Assignee: RAYTHEON COMPANY, Waltham, MA (US)

( * ) Notice: Subject to any disclaimer, the term of this patent is extended or adjusted under 35 U.S.C. 154(b) by 449 days.

(21) Appl. No.: 16/863,262

(22) Filed: Apr. 30, 2020

(65) Prior Publication Data

US 2021/0341576 A1 Nov. 4, 2021

(51) Int. Cl.
*G01S 7/48* (2006.01)
*G01S 7/484* (2006.01)
*G01S 17/58* (2006.01)
*G01S 7/4861* (2020.01)

(52) U.S. Cl.
CPC ............ *G01S 7/484* (2013.01); *G01S 7/4861* (2013.01); *G01S 17/58* (2013.01)

(58) Field of Classification Search
CPC ......... G01S 7/484; G01S 7/4861; G01S 17/58
See application file for complete search history.

(56) References Cited

U.S. PATENT DOCUMENTS 9,858,304 B2 1/2018 Marcus et al.
10,371,818 B2 8/2019 Marcus et al.

| | | |
|---|---|---|
| 2017/0343652 A1 | 11/2017 | De Mersseman et al. |
| 2018/0224547 A1 | 8/2018 | Crouch et al. |
| 2018/0299536 A1 | 10/2018 | Marron et al. |
| 2018/0299556 A1 * | 10/2018 | Marcus ................ G01S 17/894 |

(Continued)

FOREIGN PATENT DOCUMENTS

WO WO 2019/014177 A1 1/2019

OTHER PUBLICATIONS

International Search Report for corresponding International Application No. PCT/US2021/028246, filed Apr. 20, 2021, International Search Report dated Jan. 28, 2022 and mailed Feb. 8, 2022 (4 pgs.).

(Continued)

*Primary Examiner* — Kevin K Pyo
(74) *Attorney, Agent, or Firm* — Lewis Roca Rothgerber Christie LLP

(57) ABSTRACT

A laser detection and ranging system and method for operating thereof. In some embodiments, the method includes: transmitting a plurality of laser pulses, each at a respective one of a plurality of pulse transmission times; detecting a plurality of return pulses, each at a respective one of a plurality of return pulse times; and estimating a range or a range rate of a target based on the pulse transmission times and the return pulse times. Each of the pulse transmission times may be offset from a corresponding nominal pulse transmission time by a respective pulse position modulation offset, the nominal pulse transmission times being uniformly spaced with a period corresponding to a pulse repetition frequency, the pulse repetition frequency being greater than 500 kHz.

18 Claims, 4 Drawing Sheets

(56) References Cited

U.S. PATENT DOCUMENTS

2018/0364360 A1    12/2018    Zellinger et al.

OTHER PUBLICATIONS

Written Opinion of the International Searching Authority for corresponding International Application No. PCT/US2021/028246, filed Apr. 20, 2021, Written Opinion of the International Searching Authority dated Feb. 8, 2022 (7 pgs.).

Bansal, S. et al., "Nature-inspired metaheuristic algorithms to find near-OGR sequences for WDM channel allocation and their performance comparison", Opten Math, 2017, pp. 520-547, De Gruyter Open.

Dimitromanolakis, A., "Analysis of the Golomb Ruler and the Sidon Set Problems, and Determination of Large, Near-Optimal Golomb Rulers", Department of Electronic and Computer Engineering Technical University of Crete, Jun. 2002, 118 pages.

Erdos, P. et al., "On a Problem of Sidon in Additive Number Theory, and on Some Related Problems", Journal of the London Mathematical Society, 1941, vol. 16, pp. 212-215, C.F. Hodgson & Son, Ltd., London.

Fluckiger, D.U. et al., "Optimal pseudorandom pulse position modulation ladar waveforms", Applied Optics, Mar. 20, 2015, pp. 2183-2186, vol. 54, No. 9, Optical Society of America.

Gagliardi, R. et al., "Acquisition Sequences in PPM Communications", IEEE Transactions on Information Theory, Sep. 1987, pp. 738-744, vol. IT-33, No. 5, IEEE.

Hiskett, P.A. et al., "A photon-counting time-of-flight ranging technique developed for the avoidance of range ambiguity at gigahertz clock rates", Optics Express, Sep. 1, 2008, pp. 13685-13698, vol. 16, No. 18, Optical Society of America.

Mao, X. et al., "Pulse position modulation for compact all-fiber vehicle laser rangefinder development," Optical Engineering, Oct. 2017, pp. 107102-1 through 107102-8, vol. 56, No. 10, SPIE.

Milstein, A.B. et al., "Acquisition algorithm for direct-detection ladars with Geiger-mode avalanche photodiodes", Applied Optics, Jan. 10, 2008, pp. 296-311, vol. 47, No. 2, Optical Society of America.

U.S. Appl. No. 16/863,055, filed Apr. 30, 2020, unpublished application.

U.S. Appl. No. 16/863,064, filed Apr. 30, 2020, unpublished application.

U.S. Appl. No. 16/863,484, filed Apr. 30, 2020, unpublished application.

U.S. Appl. No. 16/863,744, filed Apr. 30, 2020, unpublished application.

U.S. Appl. No. 16/863,792, filed Apr. 30, 2020, unpublished application.

U.S. Appl. No. 16/863,826, filed Apr. 30, 2020, unpublished application.

U.S. Appl. No. 16/863,858, filed Apr. 30, 2020, unpublished application.

\* cited by examiner

HIGH PULSE REPETITION FREQUENCY LIDAR

GOVERNMENT LICENSE RIGHTS

This invention was made with Government support. The Government has certain rights in the invention.

FIELD

One or more aspects of embodiments according to the present invention relate to lidar systems, and more particularly to a lidar system with a high pulse repetition frequency.

BACKGROUND

Pulsed laser radar sensors, also known as lidars or ladars, are active sensing systems that determine the range to a target by measuring the time of flight of short laser pulses reflected off the target. A lidar system generally includes three primary subsystems: a laser transmitter, an optical receiver, and a processor. The transmitter is capable of generating laser pulses when commanded, and of directing these pulses in the direction of the target. These pulses may each be 1-25 nanoseconds in duration, so that the resulting range measurement may be accurate to within a few feet or meters.

The receiver includes an optical system (which may include an array of detectors) capable of collecting light reflected from the target, and a photodetector that can record the arrival of reflected light. The photodetector is capable of timing the arrival of return pulses with an accuracy similar in scale to the laser pulse duration. The processor is configured to control the operation of the transmitter and receiver, and to extract information about the target from the detections made by the receiver. The processor is also capable of synchronizing the commands issued to the transmitter and the receiver. An essential aspect of the return processing is the ability to determine target characteristics accurately despite complex scattering of the transmitted light, imperfect detection of the returns, unwanted detections due to ambient light and electrical noise, and modulation of the return due to target motion, among other practical complications.

In common operational conditions, the target return from a single transmitted pulse is not sufficient for target detection, and multiple pulses must be used. As is well-known in the art, the pulse waveform, or sequence of times at which pulses are transmitted, need to be selected carefully to allow unambiguous interpretation of the returns. If pulses are widely spaced, it may be straightforward to associate specific returns with their corresponding transmit pulses, but the integration (or dwell) time required to transmit and receive a sufficient number of pulses may be excessive. If pulses are repeated at higher frequency, the integration time decreases, but the time of flight calculation may become ambiguous.

Some problems of range ambiguity can be solved with the use of waveforms that apply some type of encoding to each pulse. One such encoding generates pulse position modulated (PPM) waveforms. PPM encodes waveforms by modulating the position of each outgoing pulse with respect to some nominal underlying position. This underlying position is determined by the pulse number divided by the waveform's nominal pulse repetition frequency (PRF). PPM encoding works adequately in some cases, but current methods of constructing these waveforms are computationally intensive and limited in applicability.

The conventional technique for determining time of flight from an extended pulsed waveform is to compute the cross-correlation between the transmit waveform and a set of recorded photodetection times. For detectors that produce sparse photodetection sequences, an efficient known method for computing the cross-correlation is provided in U.S. Pat. No. 9,858,304, the entire contents of which is hereby expressly incorporated by reference. However, this method is limited to post-collection processing, which limits the speed at which range estimates may be determined. Furthermore, this method does not account for waveform compression or stretching due to target motion. Thus, enhanced signal processing techniques that can reduce cross-correlation latency and operate effectively in the presence of arbitrary motion are needed.

SUMMARY

According to an embodiment of the present disclosure, there is provided a method for operating a laser detection and ranging system, the method including: transmitting a plurality of laser pulses, each at a respective one of a plurality of pulse transmission times; detecting a plurality of return pulses, each at a respective one of a plurality of return pulse times; and estimating a range or a range rate of a target based on the pulse transmission times and the return pulse times, each of the pulse transmission times being offset from a corresponding nominal pulse transmission time by a respective pulse position modulation offset, the nominal pulse transmission times being uniformly spaced with a period corresponding to a pulse repetition frequency, the pulse repetition frequency being greater than 500 kHz, and each pulse position modulation offset having a magnitude of at most one half of the period.

In some embodiments, the detecting of the plurality of return pulses includes directly detecting the return pulses.

In some embodiments, the detecting of the plurality of return pulses includes detecting the return pulses with a detector operating in an integrate-while-read mode.

In some embodiments, the pulse position modulation offsets define a waveform having a length of at least 1,000 pulses and a peak-to-maximum-side-lobe ratio of at least 500.

In some embodiments, the pulse position modulation offsets define a waveform having a length of at least 100,000 pulses and a peak-to-maximum-side-lobe ratio of at least 3,000.

In some embodiments, the method further includes: forming a first time difference, the first time difference being the difference between a first return pulse time of the plurality of return pulse times and a first pulse transmission time of the plurality of pulse transmission times; and incrementing a first element of a first array, the first element of the first array having an index based on the first time difference.

In some embodiments, the method further includes: applying a range rate compensation for each of a plurality of hypothetical target range rates, calculating a peak cross-correlation for each of the hypothetical target range rates, and estimating a target range after applying a range rate compensation for a first range rate, the first range rate being a range rate, from among the plurality of hypothetical target range rates, resulting in maximum peak cross-correlation.

In some embodiments, the method further includes: forming a first time difference, the first time difference being the difference between a first return pulse time of the plurality of return pulse times and a first pulse transmission time of the plurality of pulse transmission times; and incrementing a first element of a first array, the first element of the first array having an index based on the first time difference.

In some embodiments, the pulse position modulation offsets define a waveform having a length of at least 100,000 pulses.

In some embodiments, the method further includes estimating a target range and a target range rate based on: the plurality of pulse transmission times; and the plurality of return pulse times.

According to an embodiment of the present disclosure, there is provided a laser detection and ranging system, including: a laser transmitter; a receiver; and a processing circuit, the processing circuit being configured to: transmit, through the transmitter, a plurality of laser pulses, each at a respective one of a plurality of pulse transmission times; detect, using the receiver, a plurality of return pulses, each at a respective one of a plurality of return pulse times; and estimate a range or a range rate of a target based on the pulse transmission times and the return pulse times, each of the pulse transmission times being offset from a corresponding nominal pulse transmission time by a respective pulse position modulation offset, the nominal pulse transmission times being uniformly spaced with a period corresponding to a pulse repetition frequency, the pulse repetition frequency being greater than 500 kHz, and each pulse position modulation offset having a magnitude of at most one half of the period.

In some embodiments, the detecting of the plurality of return pulses includes directly detecting the return pulses.

In some embodiments, the detecting of the plurality of return pulses includes detecting the return pulses with a detector operating in an integrate-while-read mode.

In some embodiments, the pulse position modulation offsets define a waveform having a length of at least 1,000 pulses and a peak-to-maximum-side-lobe ratio of at least 500.

In some embodiments, the pulse position modulation offsets define a waveform having a length of at least 100,000 pulses and a peak-to-maximum-side-lobe ratio of at least 3,000.

In some embodiments, the processing circuit is further configured to: form a first time difference, the first time difference being the difference between a first return pulse time of the plurality of return pulse times and a first pulse transmission time of the plurality of pulse transmission times; and increment a first element of a first array, the first element of the first array having an index based on the first time difference.

In some embodiments, the processing circuit is further configured to: apply a range rate compensation for each of a plurality of hypothetical target range rates, calculate a peak cross-correlation for each of the hypothetical target range rates, and estimate a target range after applying a range rate compensation for a first range rate, the first range rate being a range rate, from among the plurality of hypothetical target range rates, resulting in maximum peak cross-correlation.

In some embodiments, the processing circuit is further configured to: form a first time difference, the first time difference being the difference between a first return pulse time of the plurality of return pulse times and a first pulse transmission time of the plurality of pulse transmission times; and increment a first element of a first array, the first element of the first array having an index based on the first time difference.

In some embodiments, the pulse position modulation offsets define a waveform having a length of at least 100,000 pulses.

According to an embodiment of the present disclosure, there is provided a method for operating a laser detection and ranging system, the method including: transmitting a plurality of laser pulses, each at a respective one of a plurality of pulse transmission times; detecting a plurality of return pulses, each at a respective one of a plurality of return pulse times; and estimating a range or a range rate of a target based on the pulse transmission times and the return pulse times, each of the pulse transmission times being offset from a corresponding nominal pulse transmission time by a respective pulse position modulation offset, the nominal pulse transmission times being uniformly spaced with a period corresponding to a pulse repetition frequency, the pulse repetition frequency being greater than 500 kHz, and each pulse position modulation offset having a magnitude of at most one half of the period, wherein the pulse position modulation offsets define a waveform having a length of at least 1,000 pulses and a peak-to-maximum-side-lobe ratio of at least 500, the method further including: applying a range rate compensation for each of a plurality of hypothetical target range rates, calculating a peak cross-correlation for each of the hypothetical target range rates, and estimating a target range after applying a range rate compensation for a first range rate, the first range rate being a range rate, from among the plurality of hypothetical target range rates, resulting in maximum peak cross-correlation.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a high pulse repetition frequency lidar provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the scope of the invention. As denoted elsewhere herein, like element numbers are intended to indicate like elements or features.

Figure 1:
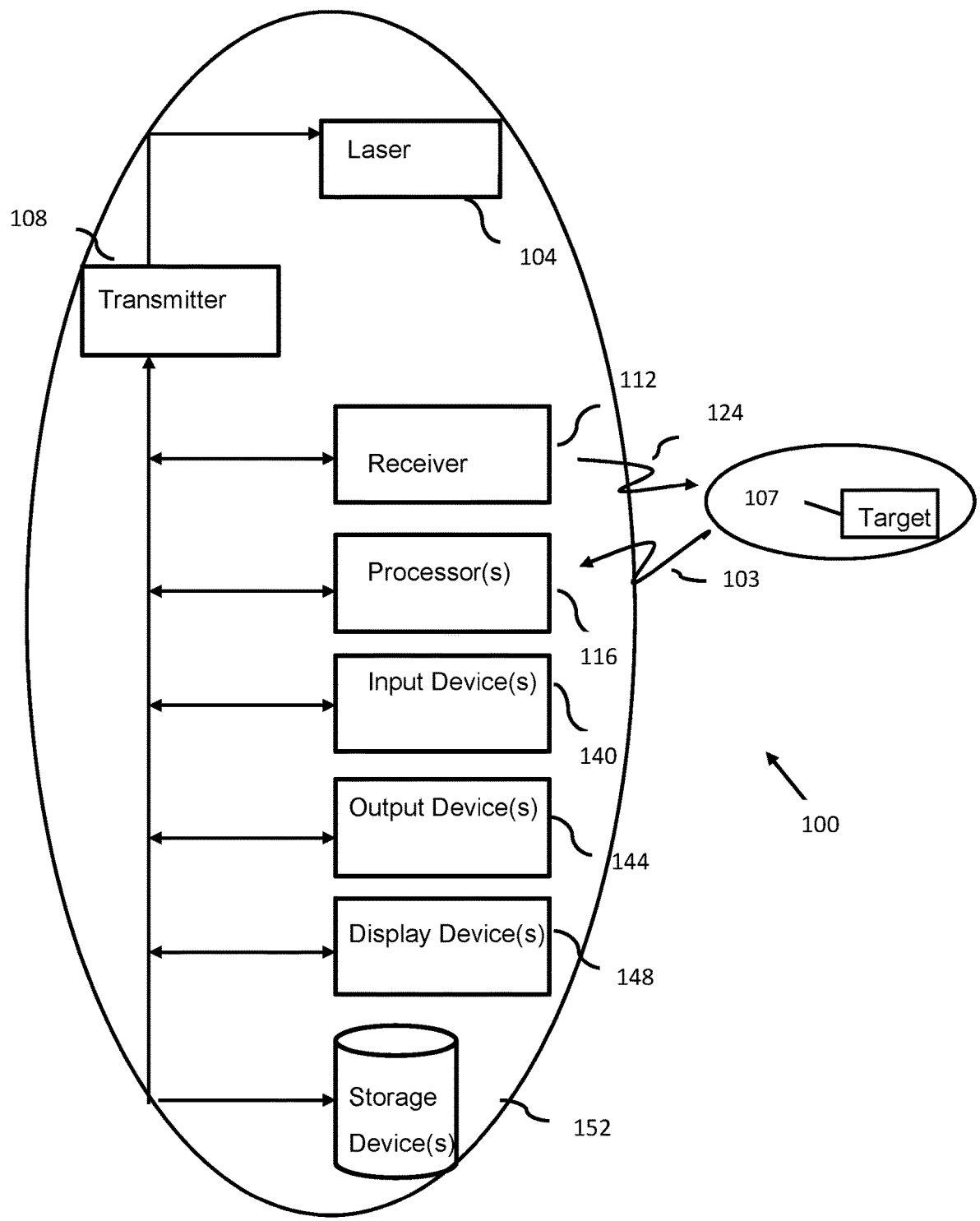
FIG. 1 is a block diagram of a lidar system, according to an embodiment of the present invention.

FIG. 1 is a system block diagram of an exemplary lidar system 100, according to some embodiments of the disclosed invention. As shown, a lidar platform includes a laser 104, a laser transmitter 108 (which is connected to the laser 104 as shown, or which may contain the laser 104) and a receiver 112. The transmitter 108 sends lidar transmission pulses 124 towards one or more targets 107 within a region of interest. Lidar return pulses (samples) 103 are generated in response to the lidar transmission pulses reflecting off of a plurality of objects (targets) within the region of interest. In some embodiments, the echo from each target (as seen at the receiver) is a version of the transmitted signal that is 1) time delayed by the transit time from transmitter to target to receiver, 2) time compressed or time dilated due to target motion, and 3) attenuated by some factor. The receiver observes a return signal consisting of each of the target echoes (plus random noise).

System 100 also includes one or more input devices 140, one or more output devices 144, one or more display devices 148, one or more processing circuits (or "processors") 116 (discussed in further detail below), and one or more storage devices 152. The modules and devices described herein can, for example, utilize the one or more processing circuits 116 to execute computer executable instructions and/or the modules and devices described herein and may include their own processor to execute computer executable instructions. As known in the art, the one or more processing circuits 116 include their own memories, such as RAMs and ROMs to store and execute program instructions. One skilled in the art would understand that the system 100 can include, for example, other modules, devices, and/or processors known in the art and/or varieties of the described modules, devices, analog-to digital converters (ADCs), digital-to-analog converters (DACs), and/or processors. In some embodiments, the receiver includes one or more (e.g., an array of) detectors.

The input devices 140 receive information from a user (not shown) and/or another computing system (not shown). The input devices 140 can include, for example, Bluetooth interface, WiFi interface, network interface, a keyboard, a scanner, a microphone, a stylus, a touch sensitive pad or display, which may be suitable for displaying digital data. The output devices 144 output information associated with the system 100 (e.g., information to remote devices, information to a speaker, information to a display, for example, graphical representations of information). The processors 116 execute instructions for the system (e.g., applications). The storage devices 152 store a variety of information/data, including lidar range data generated by the system 100 and prior measurements. The display devices 148 display information associated with the system 100, for example, target information including their position, distance, type and the like, status information, configuration information and the like. The storage devices 152 can include, for example, long-term storage, such as a hard drive, a tape storage device, or flash memory; short-term storage, such as a random-access memory, or a graphics memory; and/or any other type of computer readable storage. In some embodiments, the process according to the disclosed invention is performed by the processing circuits 116, utilizing some or all of the components illustrated in FIG. 1.

In operation, as mentioned above, the processing circuit 116 may (by controlling the laser transmitter 108) transmit a plurality of laser pulses and detect (through the receiver 112) a plurality of return pulses. Each return pulse may be caused by the detection of one or more return photons or by noise (e.g., detector noise, or photons from other sources). The lidar system may, in operation, perform a series of "dwells" between which various system parameters (e.g., the pointing of the laser transmitter 108 and the receiver 112) may be changed.

The receiver 112 may be a direct-detect receiver, which directly detects laser light reflected from the target (without first combining the received signal with an optical local oscillator signal). Direct-detect lidar systems with photon-counting detectors (e.g., with arrays of photon-counting detectors) may provide a highly sensitive means of active optical measurements for a wide variety of applications, such as three-dimensional imaging, mapping, object detection, segmentation, motion estimation or compensation, precision tracking, feature extraction, and target recognition. Their performance may be limited in part by transmitter average power, which may be difficult to maximize with the kHz pulse repetition frequency (PRF) and nanosecond pulse widths employed in some designs. A promising emerging technology is the use of all-fiber transmitters, which can attain much higher average power levels without sacrificing short pulse width, through waveforms with pulse rates on the order of at least 1 MHz. These transmitters, paired with compatible high-rate receivers, open up the possibility of direct-detect systems with significantly enhanced performance, as measured by metrics such as detection range, area coverage rate, map resolution, motion sensitivity, and feature fidelity, depending on the application. Furthermore, such systems may provide enhanced hardware and waveform commonality with other types of active optical devices, such as coherent lidars, directed energy weapons, and communications terminals, thereby easing the path to practical implementation of advanced multifunction systems.

However, conventional direct-detect techniques are significantly more challenging at high PRF, for a number of core reasons. A first challenge associated with high PRF systems is that periodic pulsed waveforms suffer range ambiguities the severity of which is proportional to PRF. For instance, a 100 kHz waveform has a 1500 m ambiguity range, which is generally large enough to allow rapid ambiguity resolution and subsequent unambiguous measurement; however, the 150 m ambiguity range at 1 MHz is too small to consistently bound extended and/or dynamic scenes, so that conventional mode design and processing techniques may fail. A second challenge associated with high PRF systems is that atmospheric backscatter is dominated by returns from the most recently transmitted pulse, so background levels (due to atmospheric backscatter) increase as at least the square of the PRF (and potentially up to the fourth power, depending on gating conditions). This can make atmospheric backscatter a significant consideration at high PRF even in applications where it is commonly negligible at low PRF. A third challenge associated with high PRF systems is that measurement noise grows with PRF, because one range gate must be used for each pulse, and each range gate contributes a nominally similar number of non-target photoevents. Thus, the raw signal to noise ratio accumulated per unit time may be inversely proportional to the square root of the PRF.

Some embodiments described herein provide a new architecture for direct-detect lidar that may mitigate or overcome challenges such as these. This architecture includes, at the high level, primary subsystems that are the laser transmitter 108, the receiver 112, and the processing circuit 116, and it specifies a coordinated set of design concepts in each of these subsystems that enable them to carry out direct-detect functions adequately when the PRF is 1 MHz or more.

To address the exacerbated range ambiguity challenge, some embodiments eschew periodic waveforms in favor of the use of unambiguous pulse position modulation (PPM) waveforms for all functions. This may enable accurate range estimation at arbitrary nominal PRFs, so the most efficient laser settings can be leveraged. To be effective at these high rates, the PPM waveforms may satisfy strong length and autocorrelation conditions simultaneously.

For compatibility with the high-PRF fiber transmitter, some embodiments use a photon-counting detector with high temporal resolution and minimal reset (or holdoff) times. Framed Geiger-mode avalanche photodiodes (APDs) (GMAPDs) used in some direct-detect systems may not meet these requirements, so some embodiments instead employ asynchronous GMAPDs, in which each pixel reads out independently, or a high-bandwidth linear-mode APD with integrate-while-read capability. Some such detector designs exhibit relatively high dark count rates (although it is possible that future detectors will exhibit better performance in this respect).

Due to the increased atmospheric backscatter and dark-count rates that result from the high nominal PRF, the resulting photoevent return stream may have a very low SNR and potentially high blocking loss factor. Some related art signal processing techniques for range acquisition, which assume static targets and low photoevent rates, may fail under these more challenging data quality conditions. Some embodiments address this issue in two distinct ways. First, the design of the PPM waveforms mentioned above is compatible with the application of any desired "burst" envelope, which alternates on and off periods to increase the delay between return reception and the most recent outgoing pulse, to "clear the air" of atmospheric backscatter. Some embodiments enable arbitrary burst designs to be applied. Second, the signal processing of some embodiments incorporates stream-compatible cross-correlation algorithms, a method for detection of weak, fast-moving signals that provides optimal estimates of target state in the presence of high spatial uncertainty and significant background. This combination of techniques alleviates the need for multiple waveforms, thus drastically simplifying the closed-loop tracking and control capabilities required of the processor and enabling (i) range and range rate estimation with the same transmitted waveform, and (ii) simultaneous range and range rate estimation.

Figure 2:
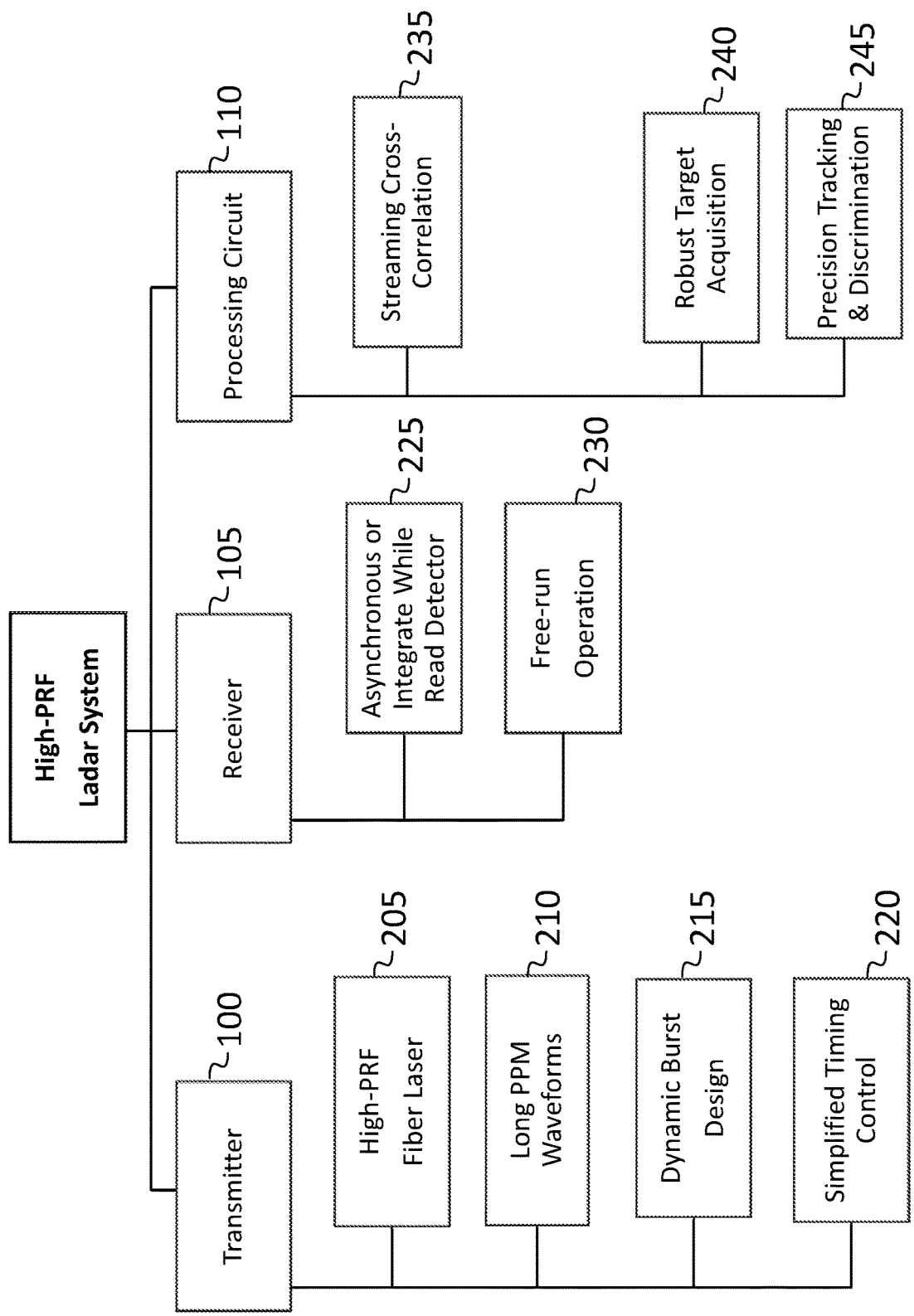
FIG. 2 is a feature diagram of a lidar system, according to an embodiment of the present invention.

FIG. 2 shows features that may be present in the laser transmitter 108, the receiver 112, and the processing circuit 116, some of which may enable effective operation at high PRFs. In the transmitter, a high PRF laser 205 may be employed to generate laser pulses, according to long PPM waveforms 210 (discussed in further detail below, and which, in some embodiments, are optimal waveforms). Dynamic burst design 215 may be used to enable operation in a burst mode which may reduce atmospheric backscatter, and the absence of a need to coordinate waveform changes with the receiver 112 and the processing circuit 116 may enable the use of simplified timing control circuit 220. In some embodiments, the characteristics of the burst mode (e.g., the length of the on time and of the off time of each cycle, and whether or not burst mode is used at all) may be adjusted during operation, based on, e.g., atmospheric conditions, or the (anticipated or measured) strength of target returns.

The receiver 112 may employ an asynchronous or integrate-while-read detector 225. An asynchronous detector may be one that does not operate in a framed mode, e.g., one in which operation is not synchronized across pixels by frame operations, such as resetting all of the pixels at the beginning of a frame, and reading out all of the pixels at the end of a frame. Instead the pixels may operate independently, each pixel sending an electrical pulse when it detects a photoevent and then being armed again after, in some embodiments, a short dead time. An integrate-while-read detector may be one that operates in a framed mode. All of the pixels may be armed at the beginning of a frame, and readout may occur for all of the pixels at the end of the frame; the reading out of each frame may be performed after the beginning of the next frame, so that a pixel may detect a new photoevent while any photoevent detected during the previous frame is being read out.

The detector may also employ free-run operation 230, i.e., it may be armed at all times possible, e.g., without regard for the timing of transmitted pulses (in contrast to low-PRF systems in which the detector may be armed only during a "range gate" that is selected to be as short as possible while being likely to contain the target returns). In a high-PRF system, such range gating may not be feasible because target range uncertainty or range extent may be comparable to or greater than half of the range separation of the laser pulses in flight.

The processing circuit 116 may use (i) a streaming cross correlation method 235, which may be an efficient method for calculating the cross-correlation between pulse transmission times and return pulse times, (ii) robust target acquisition methods 240, and (iii) precision tracking and discrimination methods 245 (discussed in further detail below).

Figure 3A:
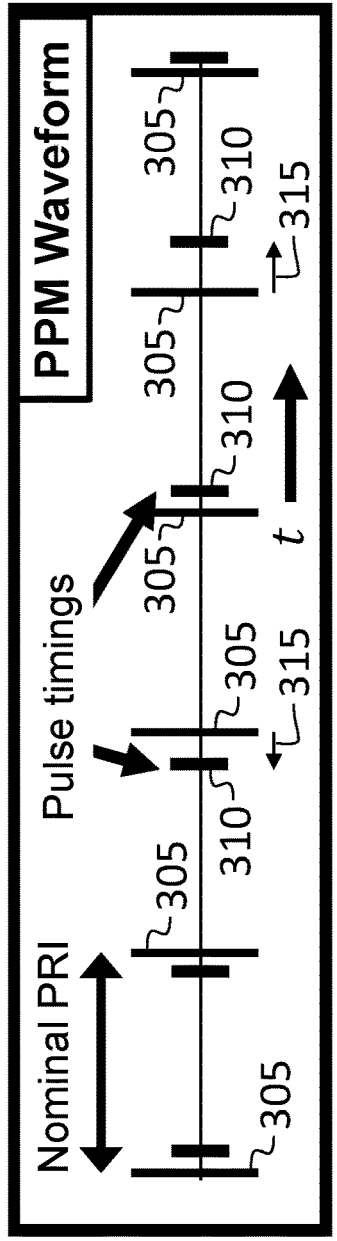
FIG. 3A is a timing diagram, according to an embodiment of the present invention.
Figure 3B:
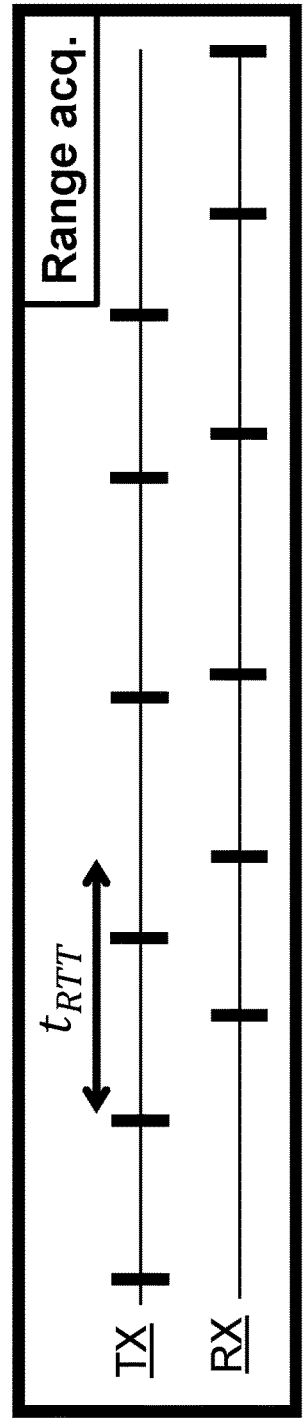
FIG. 3B is a timing diagram, according to an embodiment of the present invention.

FIG. 3A shows an example of a PPM waveform. The nominal pulse transmission times 305 are uniformly spaced, with a period (or pulse repetition interval (PRI)) corresponding to the pulse repetition frequency. Each of the pulse transmission times 310 is offset (or "dithered") from a corresponding nominal pulse transmission time 305 by a respective pulse position modulation offset (or "jitter") 315. Each pulse position modulation offset may have a magnitude that is at most one half of the repetition period. Each return pulse resulting from a transmitted pulse may, in such a case, arrive at a time (referred to as a "return pulse time") that is affected both by the pulse transmission time of the laser pulse that produced the return pulse and the range to the object (e.g., the target) from which the laser pulse scattered to produce the return pulse. When the laser pulses are transmitted using a suitable PPM waveform, the range to the target may be unambiguously determined, as illustrated in FIG. 3B, by cross-correlating return pulse times with pulse transmission times. In such a cross-correlation, the lag associated with the peak of the cross-correlation may yield the target round trip time. The quality of a PPM waveform may be measured by its length and the shape of its auto-correlation. For example, the required code length may be driven by link budget, and the peak-to-maximum-side-lobe ratio (PMSLR) may serve as a measure of code quality. The "length of the waveform" as used herein, is the number of pulses in the waveform. An "ideal code", as used herein, is one in which the PMSLR is equal to the number of pulses.

Over time, with PPM waveforms, there has been significant interest in developing optimal PPM waveforms. A property of the PPM waveforms for this lidar application is that the waveforms may be very long. PMSLR and waveform length are independently beneficial for two reasons: high PMSLR reduces range ambiguity, and longer waveforms improve the signal to noise ratio. There are several methods for producing optimal waveforms, four of which are briefly outlined below. In these methods, PPM waveforms are built by determining or choosing jitter modulation values in a way that ensures maximum PMSLR.

For example, in a first method, all of the "bad" jitter values are computed and discarded. "Bad" modulation values are ones that would result in baud collisions and which would degrade the PMSLR. Baud collisions occur in a code of length N if there exist two or more pairs of pulses with shared differences. The set of bad jitter values, J_bad, for the (N+1)-th code element, may be computed, via $$J_{bad} = j_{N+1-(i-k)} + j_i - j_k \text{ for } i < k \le N,$$

where the j are the jitter values, N is the current code length, and i and k are indices referring to any of the other elements in the sequence for indices less than N. Discarding the bad jitter values may result in a PPM waveform in which none of the jitter values are deemed bad, and which is, therefore, optimal.

In a second method, long non-optimal PPM waveforms may be generated using the following five steps:

1. An initial code is supplied (typically consisting of a single element), along with a desired maximum side-lobe height
2. A candidate jitter value is randomly selected from the pool of available jitter values, and is used to define a new code element, which is appended to the end of the initial code
3. The values of a hash-table are incremented, at keys corresponding to the differences in the updated code. These values are checked to see if any exceed the desired maximum side-lobe height
4. If the above condition fails, then the new code element is discarded, and the process is repeated
5. Otherwise, the new code element is kept, and the process is repeated.

In a third method, codes that can be repeated head-to-tail and maintain their PMSLR may be generated by (i) forming the following:

$$J_< = j_{N+1-(i-k)} + (j_i - j_k)$$
$$J_> = j_{N+1+(i-k)-N_{max}} - (j_i - j_k)$$
$$J_= = \frac{j_{N+1-(i-k)} + j_{N+1+(i-k)-N_{max}}}{2}$$

(ii) defining $J_{bad}$ as follows:

$$J_{bad} = J_< \cap J_> \cap J_=$$

and (iii) discarding "bad" jitter values, as in the first method.

In a fourth method, an algorithm may calculate a long cyclically optimally PPM waveform, based on a desired PRI, $T_{PRI}$, a jitter resolution $\Delta j$, and a maximum jitter fraction $f_j$, as follows:

1. Pre-compute a list of prime numbers up to the potential maximum desired code length
2. From this list, select the largest prime number p* less than or equal to $$2f_j \frac{T_{PRI}}{\Delta j}$$

3. Construct the list of pulse indices, m=0: p*−1
4. Construct the list of pulse jitters, dJs="mod" (m², p*)−(p*−1)/2
5. Construct the list of nominal pulse timings, T=m×ceil ($T_{PRI}/\Delta j$)
6. Construct the pulse timings as $t^0 = \Delta j \times (T+dJs)$.

As mentioned above, the processing circuit 116 may perform an efficient, streaming method 235 for calculating the cross-correlation. For a stationary target the cross-correlation of the set of pulse transmission times and the set of return pulse times may have a peak at a time offset equal to the (round-trip) light travel time from the lidar system to the target and back, each return pulse being received at a time that is later than the transmission of the corresponding laser pulse by a delay equal to the round-trip light travel time.

Figure 4:
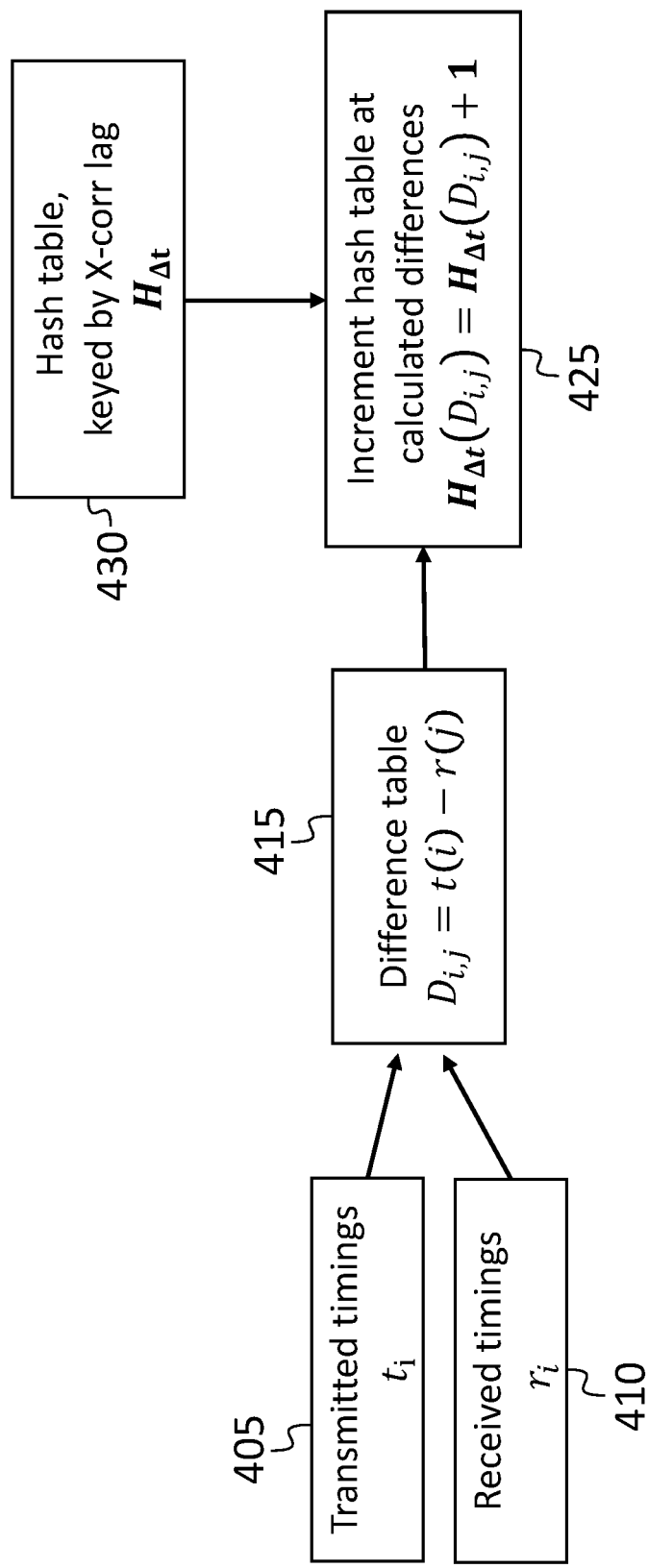
FIG. 4 is a hybrid data and flow diagram, according to an embodiment of the present invention.

In some embodiments, the cross-correlation may be calculated in an efficient manner, referred to as a "streaming cross-correlation" 235, and illustrated in FIG. 4. The pairwise differences of (i) the plurality of pulse transmission times (or "transmitted timings") 405 and (ii) the plurality of return pulse times (or "received timings") 410 may be calculated (e.g., to form a table, or array, of differences 415). An index (or "key") into an array (or "hash table", or "cross-correlation array") may then be formed based on each difference, and the element of the cross-correlation array corresponding to the respective index may be incremented (at 425) for each calculated difference. This process may result in the calculated cross-correlation being formed in the cross-correlation array. In some embodiments a table of differences is not formed, and instead each calculated difference is used to increment a corresponding element of the cross-correlation array without first having been stored in an array of differences together with other calculated differences.

In some embodiments two nested loops are used to iterate over (e.g., in an outer loop) the pulse transmission times and over (e.g., in an inner loop) the return pulse times. In some embodiments, the outer loop instead iterates over the return pulse times and the inner loop iterates over the pulse transmission times. At each iteration of the inner loop, a difference between the current return pulse time and the current pulse transmission time is calculated, an index into the cross-correlation array is formed based on the difference, and the element, at the index, in the cross-correlation array is incremented (e.g., incremented by one, or incremented by an amount different from one). Negative differences may be discarded, as not corresponding to a plausible target position. As used herein, "the difference between x and y", where x and y are two numbers, is x-y. If a calculated difference is out of range, e.g., it corresponds to an array index at which memory has not been allocated, or to an array index that is less than zero, then the calculated difference may be discarded, i.e., no further action may be taken based on its value.

In some embodiments, robust target acquisition 240 may include applying a range rate compensation for each of a plurality of hypothetical target range rates, calculating a peak cross-correlation for each of the hypothetical target range rates, and selecting as the estimated target range rate the hypothetical target range rate for which the peak cross-correlation is greatest. The target range may then be estimated by applying a range rate compensation based on the estimated target range rate.

Precision target tracking and discrimination may involve estimating the six degrees of freedom of the motion of a target, and summing a plurality of images of the target after shifting and rotating the images to compensate for motion of the target between the taking of the images. An example of such a method is described in U.S. Pat. No. 10,371,818.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

As used herein, the word "or" is inclusive, so that, for example, "A or B" means any one of (i) A, (ii) B, and (iii) A and B. As used herein, when a first quantity (e.g., a first number) is referred to as being "based on" a second quantity (e.g., a second number) it means that the second quantity influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory) as the second quantity.

Although limited embodiments of a high pulse repetition frequency lidar have been specifically described and illustrated herein, many modifications and variations will be apparent to those skilled in the art. Accordingly, it is to be understood that a high pulse repetition frequency lidar employed according to principles of this invention may be embodied other than as specifically described herein. The invention is also defined in the following claims, and equivalents thereof.

What is claimed is:

1. A method for operating a laser detection and ranging system, the method comprising:
    transmitting a plurality of laser pulses, each at a respective one of a plurality of pulse transmission times;
    detecting a plurality of return pulses, each at a respective one of a plurality of return pulse times; and
    estimating a range or a range rate of a target based on the pulse transmission times and the return pulse times,
    each of the pulse transmission times being offset from a corresponding nominal pulse transmission time by a respective pulse position modulation offset,
    the nominal pulse transmission times being uniformly spaced with a period corresponding to a pulse repetition frequency,
    applying a range rate compensation for each of a plurality of hypothetical target range rates,
    calculating a peak cross-correlation for each of the hypothetical target range rates, and
    estimating a target range after applying a range rate compensation for a first range rate, the first range rate being a range rate, from among the plurality of hypothetical target range rates, resulting in maximum peak cross-correlation.

2. The method of claim 1, wherein the detecting of the plurality of return pulses comprises directly detecting the return pulses.

3. The method of claim 2, wherein the detecting of the plurality of return pulses comprises detecting the return pulses with a detector operating in an integrate-while-read mode.

4. The method of claim 1, wherein the pulse position modulation offsets define a waveform having a length of at least 1,000 pulses and a peak-to-maximum-side-lobe ratio of at least 500.

5. The method of claim 4, wherein the pulse position modulation offsets define a waveform having a length of at least 100,000 pulses and a peak-to-maximum-side-lobe ratio of at least 3,000.

6. The method of claim 1, further comprising calculating a cross-correlation between a first return pulse time of the plurality of return pulse times and a first pulse transmission time of the plurality of pulse transmission times by:
    forming a first time difference, the first time difference being the difference between the first return pulse time of the plurality of return pulse times and the first pulse transmission time of the plurality of pulse transmission times; and
    incrementing a first element of a cross-correlation array, the first element of the cross-correlation array having an index based on the first time difference.

7. The method of claim 1, further comprising:
    forming a first time difference, the first time difference being the difference between a first return pulse time of the plurality of return pulse times and a first pulse transmission time of the plurality of pulse transmission times; and
    incrementing a first element of a cross-correlation array, the first element of the cross-correlation array having an index based on the first time difference.

8. The method of claim 7, wherein the pulse position modulation offsets define a waveform having a length of at least 100,000 pulses.

9. The method of claim 1, further comprising estimating a target range and a target range rate based on:
    the plurality of pulse transmission times; and
    the plurality of return pulse times.

10. A laser detection and ranging system, comprising:
    a laser transmitter;
    a receiver; and
    a processing circuit,
    the processing circuit being configured to:
        transmit, through the transmitter, a plurality of laser pulses, each at a respective one of a plurality of pulse transmission times;
        detect, using the receiver, a plurality of return pulses, each at a respective one of a plurality of return pulse times; and
        estimate a range or a range rate of a target based on the pulse transmission times and the return pulse times,
    each of the pulse transmission times being offset from a corresponding nominal pulse transmission time by a respective pulse position modulation offset,
    the nominal pulse transmission times being uniformly spaced with a period corresponding to a pulse repetition frequency,
    apply a range rate compensation for each of a plurality of hypothetical target range rates,
    calculate a peak cross-correlation for each of the hypothetical target range rates, and
    estimate a target range after applying a range rate compensation for a first range rate, the first range rate being a range rate, from among the plurality of hypothetical target range rates, resulting in maximum peak cross-correlation.

11. The system of claim 10, wherein the detecting of the plurality of return pulses comprises directly detecting the return pulses.

12. The system of claim 11, wherein the detecting of the plurality of return pulses comprises detecting the return pulses with a detector operating in an integrate-while-read mode.

13. The system of claim 10, wherein the pulse position modulation offsets define a waveform having a length of at least 1,000 pulses and a peak-to-maximum-side-lobe ratio of at least 500.

14. The system of claim 13, wherein the pulse position modulation offsets define a waveform having a length of at least 100,000 pulses and a peak-to-maximum-side-lobe ratio of at least 3,000.

15. The system of claim 10, wherein the processing circuit is further configured to calculates a cross-correlation between a first return pulse time of the plurality of return pulse times and a first pulse transmission time of the plurality of pulse transmission times by:
   forming a first time difference, the first time difference being the difference between the first return pulse time of the plurality of return pulse times and the first pulse transmission time of the plurality of pulse transmission times; and
   incrementing a first element of a cross-correlation array, the first element of the cross-correlation array having an index based on the first time difference.

16. The system of claim 10, wherein the processing circuit is further configured to:
   form a first time difference, the first time difference being the difference between a first return pulse time of the plurality of return pulse times and a first pulse transmission time of the plurality of pulse transmission times; and
   increment a first element of a cross-correlation array, the first element of the cross-correlation array having an index based on the first time difference.

17. The system of claim 16, wherein the pulse position modulation offsets define a waveform having a length of at least 100,000 pulses.

18. A method for operating a laser detection and ranging system, the method comprising:
   transmitting a plurality of laser pulses, each at a respective one of a plurality of pulse transmission times;
   detecting a plurality of return pulses, each at a respective one of a plurality of return pulse times; and
   estimating a range or a range rate of a target based on the pulse transmission times and the return pulse times,
   each of the pulse transmission times being offset from a corresponding nominal pulse transmission time by a respective pulse position modulation offset,
   the nominal pulse transmission times being uniformly spaced with a period corresponding to a pulse repetition frequency, the pulse repetition frequency being greater than 500 kHz, and
   each pulse position modulation offset having a magnitude of at most one half of the period,
   wherein the pulse position modulation offsets define a waveform having a length of at least 1,000 pulses and a peak-to-maximum-side-lobe ratio of at least 500,
   the method further comprising:
      applying a range rate compensation for each of a plurality of hypothetical target range rates,
      calculating a peak cross-correlation for each of the hypothetical target range rates, and
      estimating a target range after applying a range rate compensation for a first range rate, the first range rate being a range rate, from among the plurality of hypothetical target range rates, resulting in maximum peak cross-correlation.

\* \* \* \* \*